United States Patent [19]
Packard et al.

[11] Patent Number: 5,946,173
[45] Date of Patent: Aug. 31, 1999

[54] GROUND FAULT CIRCUIT INTERRUPTER WITH ENHANCED RANGE

[75] Inventors: Thomas N. Packard, Syracuse; David A. Finlay, Sr., Marietta, both of N.Y.

[73] Assignee: Pass Seymour, Inc., Solvay, N.Y.

[21] Appl. No.: 09/059,682

[22] Filed: Apr. 13, 1998

Related U.S. Application Data

[60] Provisional application No. 60/050,026, Jun. 16, 1997.
[51] Int. Cl.$^6$ ........................................................ H02H 3/16
[52] U.S. Cl. ................................................. 361/42; 361/45
[58] Field of Search ................................... 361/45, 42–44, 361/46–50, 93–94, 99, 113

[56] References Cited

U.S. PATENT DOCUMENTS

| | | | |
|---|---|---|---|
| 3,962,606 | 6/1976 | Burns et al. | 361/45 |
| 5,231,309 | 7/1993 | Soma et al. | 307/125 |

*Primary Examiner*—Jeffrey Gaffin
*Assistant Examiner*—Michael J. Sherry
*Attorney, Agent, or Firm*—Bond, Schoeneck & King, LLP; Stephen B. Salai

[57] ABSTRACT

A ground fault circuit interrupter comprises a transformer having a saturable core; a secondary winding on the core; an integrating detector coupled to the secondary winding; and a pulse stretcher connected between the secondary winding and the differential detector for stretching high voltage short duration pulses sufficiently to allow them to be detected by the detector.

4 Claims, 3 Drawing Sheets

$V_{TH}$ $V_{TH}$ 5,946,173

1

GROUND FAULT CIRCUIT INTERRUPTER WITH ENHANCED RANGE

The present application claims the benefit of U.S. Provisional Application No. 60/050,026 filed Jun. 16, 1997.

BACKGROUND OF THE INVENTION

Ground fault circuit interrupters (GFCI) for interrupting the flow of electrical power to a device upon the occurrence of a ground fault have been known for many years. Known devices are usually effective in detecting ground faults of the type caused by current accidentally flowing through a human body. Such currents are normally in the low range of 6 mA to about 264 mA. However, other types of ground faults, such as the types caused by miswiring or inrush currents may produce high currents on the order of 4 amps to 120 amps or more that might not be reliably detected by known GFCI's.

Conventional ground fault circuit interrupters usually employ a transformer having a toroidal core of magnetic material through which the hot and neutral wires of the electrical circuit flow to form a differential primary and about which is wound a secondary winding, often about 1,000 turns, from which the ground fault signal is detected. Typically, the secondary winding is connected to the input of a sensitive operational amplifier, which is arranged with suitable feedback and output components to generate a trigger signal in response to a ground fault for opening contacts in the primary circuit for interrupting the flow of power.

The differential toroidal transformer arrangement used in conventional ground fault circuit interrupters is effective over the low range of ground faults commonly experienced, but may be less effective or ineffective in detecting very high current ground faults.

Ground fault currents on the low end of the human physiology range, such as approximately 6 mA ground faults result in magnetic flux in the toroidal core well below the saturation range. Currents on the high end of the human physiology range, in the approximately 264 mA range may produce some saturation of the transformer, but generally result in an output signal at the secondary, whose waveshape is a reasonable facsimile of the input signal. Non-human physiology based ground faults that produce currents of 4 amps to 120 amps or more, completely saturate the transformer, and produce high voltage extremely short duration pulses on the secondary winding. Integrating ground fault detector circuits attached to the secondary winding adequately detect ground fault currents in the human physiology range, both the upper and lower ends of the range, but may be insensitive to the extremely short duration high voltage pulses produced when the transformer is driven into saturation by high current ground faults.

It is an object of this invention to provide an improved ground fault circuit interrupter that substantially maintains the sensitivity to ground faults in the human physiology range, while greatly increasing sensitivity to high current ground faults outside this range.

It is another object of this invention to provide an improved ground fault circuit interrupter with enhanced operating range that is not significantly more complex than existing ground fault circuit interrupters.

It is still another object of this invention to provide a ground fault circuit interrupter with enhanced operating range that is not significantly more expensive than existing ground fault circuit interrupters.

2

Briefly stated, and in accordance with a presently preferred embodiment of the invention, a ground fault circuit interrupter comprises a transformer having a saturable core; a secondary winding on the core; an integrating detector coupled to the secondary winding; and a pulse stretcher connected between the secondary winding and the differential detector for stretching high voltage short duration pulses sufficiently to allow them to be detected by the detector.

BRIEF DESCRIPTION OF THE DRAWINGS

The novel aspects of the invention are set forth with particularity in the appended claims. The invention itself, together with further objects and advantages thereof may be more readily comprehended by reference to the following detailed description of the presently preferred embodiment of the invention, taken in conjunction with the accompanying drawings, in which:

DETAILED DESCRIPTION OF THE PREFERRED EMBODIMENT

Figure 1:
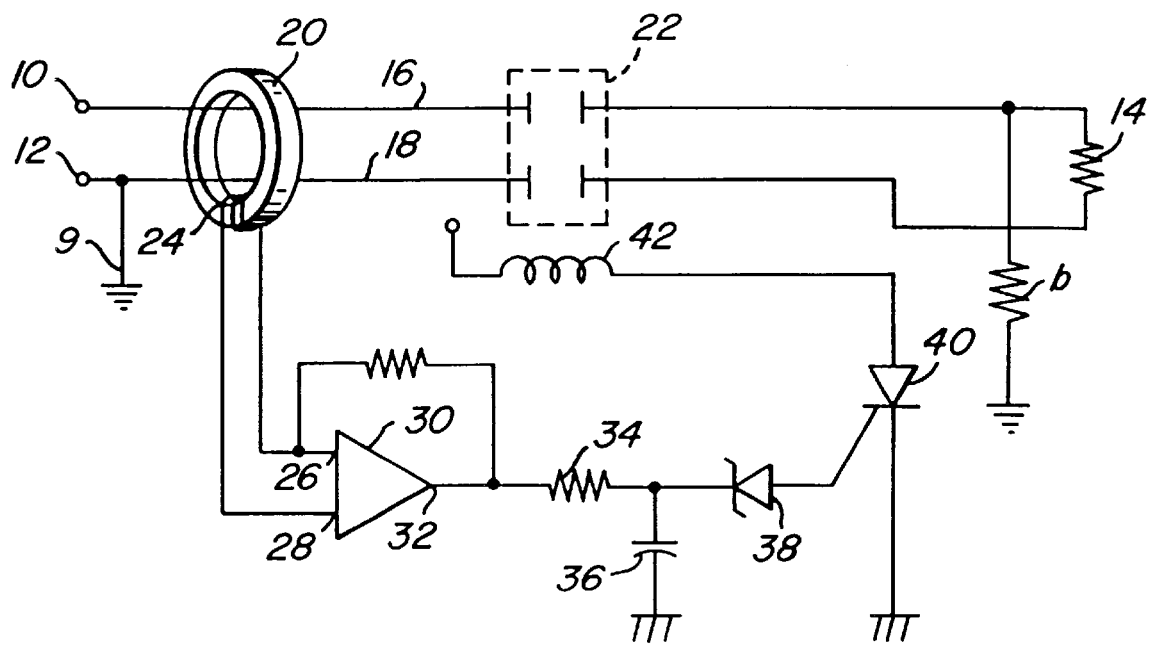
FIG. 1 is a schematic diagram of a ground fault circuit interrupter in accordance with the prior art.

Referring now to FIG. 1, a known ground fault circuit interrupter is illustrated in schematic diagram form. The ground fault circuit includes a power source having at least a hot connection 10 and a neutral connection 12, a load 14, and a pair of conductors 16, 18 connecting the load to the source. The conductors pass through the core of a transformer 20, preferably a toroidal transformer, to form the primaries thereof. At least one, and preferably a pair of circuit interrupters 22 is connected in series with the load, so that power from the source to the load can be interrupted upon the detection of a ground fault.

Transformer 20 is provided with a high impedance secondary winding 24 that preferably includes a large number, for example 1,000 of turns of small gauge wire.

Because both the hot electrical conductor and neutral electrical conductor pass through the transformer core in the same direction, the core is responsive to differential current flowing between the two primaries. That is, when no ground fault is present and the currents flowing in the hot conductor and the neutral conductor are the same but opposite, zero or essentially zero voltage appears on the secondary winding 24. However, when a ground fault is present and, for example, the current flowing through the hot conductor is greater than the current flowing through the neutral conductor, more specifically when the current flowing through the hot conductor is equal to the current flowing through the neutral conductor plus the current flowing in the ground fault, then an output is produced on the secondary winding.

Current flow to ground other than through the neutral conductor produces an imbalance in current flow through the hot and neutral conductors between the load and the source. This imbalance is sensed by transformer 20, which produces a signal at secondary winding 24 in response to the ground fault. The secondary winding 24 is connected to input terminals 26 and 28 of amplifier 30, which has an output 32. The output of amplifier 30 is connected to a time delay consisting of a resistor 34 and capacitor 36. The time delay is connected by way of a zener diode 38 to the gate of an SCR 40, which is connected in series with a coil 42 of the circuit interrupter 22.

When a ground fault of sufficient magnitude compared to the zener diode and duration compared with the time constant of the delay circuit occurs, a signal is applied to the gate of SCR 40, the SCR turns on energizing coil 42, and the circuit interrupter disconnects the load 14 from the power source.

The ground fault waveform appearing on the primary winding is the same as the waveform of the power source, typically a 60 Hz sine wave.

The nature of the output waveform appearing on the secondary winding is strongly dependent upon the duration and magnitude of the ground fault.

Figure 2A:
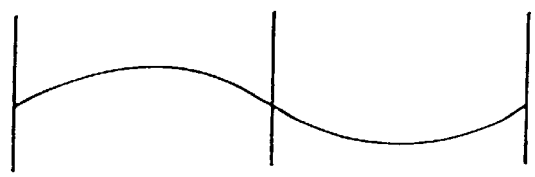
FIGS. 2a through 2g are wave form diagrams of signals appearing in the ground fault circuit interrupter of FIG. 1 at different magnitudes of round faults.
Figure 2B:
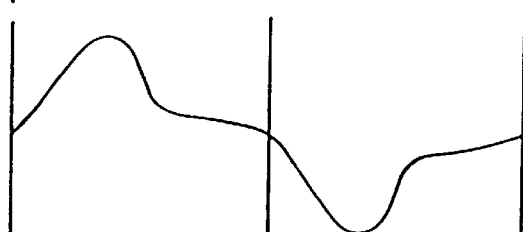

Ground faults occurring because of the flow of current through human physiology typically have a range from a few ma, more likely about 6 mA on the low end, to about 264 mA on the upper end. The magnitude of current flowing through human physiology depends upon the nature of contact, the amount of moisture present, the path of the current through the human body, and other known factors. Known ground fault circuit interrupters are typically designed so that currents at the low end of the human physiology range fall in the linear region of the transformer, that is they do not produce any significant saturation of the core, while currents in the high end of the human physiology range may produce slight saturation to moderate saturation. In each of these cases, the wave form produced at the output of the secondary winding of the transformer is a more or less faithful reproduction of the wave form appearing at the primary, with at most some distortion. FIG. 2a shows the undistorted waveform produced by a low, 6 mA ground fault current. FIG. 2b shows the slightly distorted current produced by a 264 mA ground fault current.

Figure 2C:
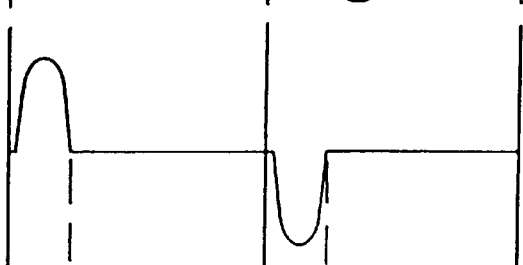

When the differential input current exceeds the high end of the human physiology range, the transformer core is driven well into saturation. The output appearing at the secondary winding when the core saturates is a high voltage very short duration pulse. Pulse widths substantially less than 1 mS are commonly produced by high current ground faults. FIG. 2c shows the secondary waveform produced by a 20A ground fault, and FIG. 2e shows the waveform produced by a 120A ground fault.

Figure 2D:
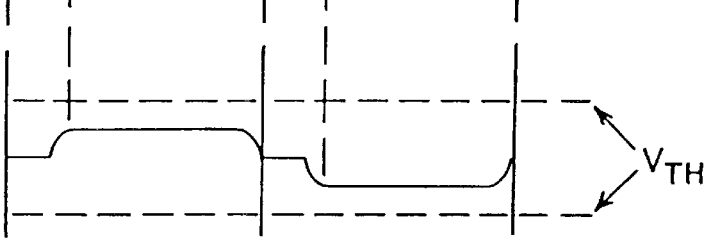

The transformer secondary 24 is connected to the input of operational amplifier 30 operating in a very high gain mode. The output of the operational amplifier varies strongly with the input signal. For signals produced by ground faults at the low end of the human physiology range, the output of the operational amplifier 30 will produce a linear representation of the sine wave input thereof with very little clipping distortion, and produce an amplitude that is proportional to the ground fault current. As the current increases towards the high end of the human physiology range, substantial clipping occurs and the output of the operational amplifier may be a square wave or approximately a square wave having a maximum value substantially equal to the supply voltage of the operational amplifier, for example 13.5 volts, as shown in FIG. 2f. The output of the time delay circuit increases exponentially to the threshold voltage of the zener diode as shown in FIG. 2g and the SCR triggers the circuit interrupters to open.

Figure 2E:
Figure 2F:
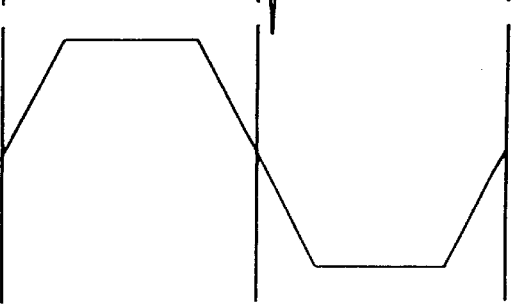
Figure 2G:
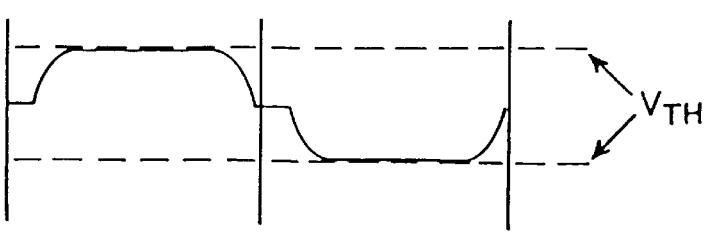

When the ground fault current exceeds the high end of the human physiology range, significant saturation of the transformer core occurs, producing very high voltage and very short duration pulses at the output of the secondary winding as shown in FIGS. 2c and 2e. The very short input pulses applied to the operational amplifier produce a correspondingly short output pulse from amplifier 30, with amplitude substantially equal to the supply voltage of amplifier 30. The operational amplifier and the associated resistor-capacitor combination that drive the control circuits for the circuit interrupters are in effect an integrator and such a circuit is not responsive to very short duration pulses limited to the supply voltage amplitude. The output of the integrator is shown in FIG. 2g for a 264 mA ground fault, and in FIG. 2d for a 120A ground fault. Accordingly, even though very high ground fault currents may be flowing, the integrated output of the operational amplifier is lower for very high current ground faults than for lower current ground faults, and the ground fault interrupter circuit shown in FIG. 1 may not trip, and therefore the ground fault circuit interrupter fails to achieve its desired function. Thus, the very undesirable situation of providing a ground fault circuit interrupter that is effective at relatively low ground fault currents but is wholly ineffective at higher ground fault currents is produced.

Figure 3A:
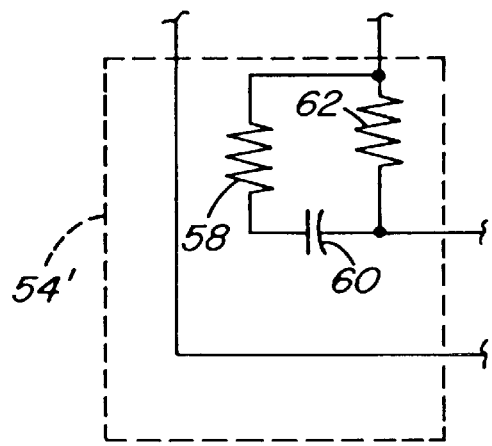
FIG. 3a is a schematic diagram of an alternative pulse stretcher for use in the ground fault circuit interrupter of FIG. 3.
Figure 3:
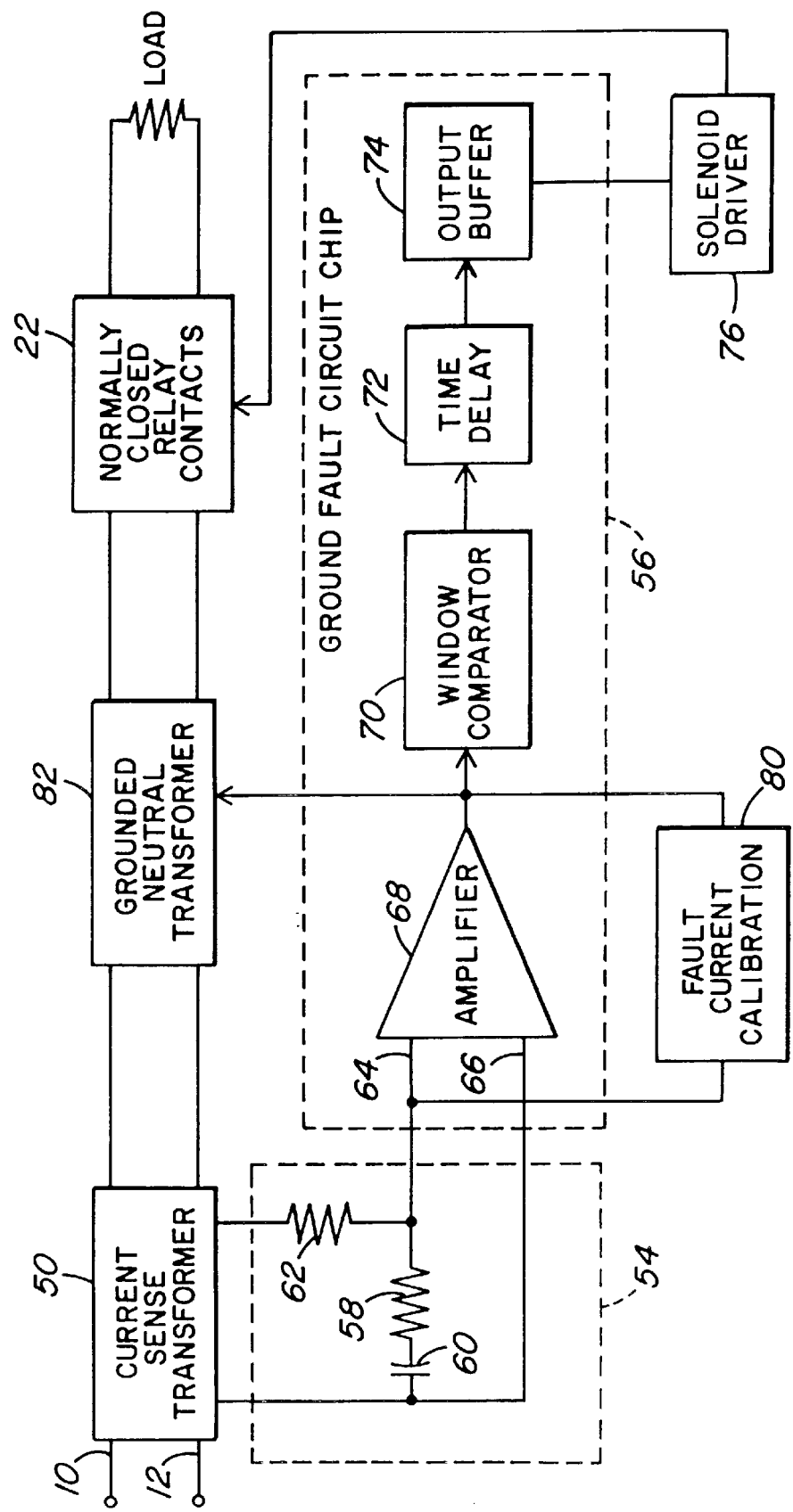
FIG. 3 is a block diagram of a ground fault circuit interrupter in accordance with this invention.

A block diagram of a ground fault circuit interrupter in accordance with a presently preferred embodiment of this invention is illustrated at FIG. 3. In this and the other figures, like elements are designated by like reference numerals, and it will be immediately apparent that many of the elements of the new ground fault circuit of this invention are similar to those used in existing ground fault circuit interrupters. The new ground fault circuit interrupter uses a differential toroidal current source transformer 50 to detect ground fault currents. The transformer is connected with the hot 10 and neutral 12 conductors of an electrical circuit extending from a power source to a load passing through the transformer core to form a differential primary. A secondary winding, not shown, for example a 1,000 turn winding is provided on the core for producing a secondary output signal. An integrating detector is coupled to the secondary winding, and is provided with an output circuit including a resistor and a capacitor connected to a control circuit for controlling the circuit interrupters to interrupt the flow of current when a ground fault is detected.

In order to substantially overcome the insensitivity of existing ground fault circuit interrupters to the output signals produced by high magnitude pulses created by the high current ground faults, the ground fault circuit interrupter of this invention is provided with a pulse stretcher 54 connected between the secondary winding and the input of the amplifier 68. Coupling resistance 62 represents the secondary winding resistance or could be a discrete resistor connected from the transformer to input 64 of amplifier 68. The pulse stretcher in accordance with the embodiment shown in FIG. 3 includes a resistor 58 and a capacitor 60 connected between inputs 64 and 66 of amplifier 68 The pulse stretcher includes a relatively high value resistor 58, such as a 5 K ohm resistor compared with the coupling resistance, and a capacitor connected in series. The values of the resistor and capacitor are selected so that the combination has a relatively high impedance at the frequency of the power source controlled by the ground fault circuit interrupter, typically 60 cycles. As long as the impedance of the resistor and capacitor is high compared to the impedance of the resistor coupling the transformer to the differentiating detector, the pulse stretcher will have little effect on the signal produced by low magnitude human physiology generated ground faults. Typically, the resistor and capacitor are selected to have an impedance approximately ten times that of the coupling resistor at the supply frequency.

However, when a high voltage short duration pulse, such as the pulses created by saturating magnitude ground faults appears, the pulse stretcher will significantly increase the duration of the pulse, thus enabling it to be satisfactorily detected by the detector.

The detector 56 is preferably implemented in a single integrated circuit device, for example in RV 4141 detector of the type manufactured by Raytheon Semiconductor. The detector includes an amplifier 68, a window comparator 70 connected to the output of amplifier 69, a time delay circuit 72 connected to the window comparator, and an output buffer 74 connected to the output of time delay 72. The output of the output buffer 74 is connected to the solenoid driver 76. The output of the solenoid driver 76 is connected to the normally closed contacts of circuit interrupter 22, which is connected between the power source and the load.

Preferably, a ground fault circuit interrupter in accordance with this invention also includes a fault current calibration circuit 80 connected between an input of amplifier 68 and the output of amplifier 68. The output of amplifier 68 is also connected to a grounded neutral transformer 82 for detecting when the neutral lead is grounded at the load.

FIG. 3a shows an alternative embodiment of the pulse stretcher shown in the dotted box in FIG. 3. In accordance with the alternative embodiment, the output of the differential transformer is connected in series with an input of amplifier 68 through resistor 62. The series combination of resistor 58 and capacitor 60 is connected in parallel with resistor 62, and the combination therefor is connected in series between the current sense transformer and the amplifier.

While the invention has been described in connection with a presently preferred embodiment thereof, certain modifications and changes will suggest themselves to those skilled in the art, and accordingly the invention is intended to be limited solely by the appended claims.

What is claimed is:

1. A ground fault circuit interrupter comprising:
   a transformer with a saturable core;
   a secondary winding on the core for producing short high voltage pulses when the core is saturated and for producing sinusoidal waveforms when the core is not saturated;
   a high gain feed back amplifier having first and second inputs, a resistor connected between the transformer and one of the inputs, and a resistor and a capacitor connected in series across the inputs; and
   a window comparator connected to the high gain feed back amplifier.

2. The ground fault circuit interrupter of claim 1 in which the resistor and capacitor connected in series have a time constant of at least about 0.1 millisecond.

3. A ground fault circuit interrupter comprising:
   a transformer with a saturable core;
   a secondary winding on the core for producing short high voltage pulses when the core is saturated and for producing sinusoidal waveforms when the core is not saturated;
   a high gain feed back amplifier having first and second inputs, a resistor connected between the transformer and one of the inputs, and a resistor and a capacitor connected in series, the combination in parallel with the resistor connected between the transformer and one of the inputs; and
   a window comparator connected to the high gain feed back amplifier.

4. The ground fault circuit interrupter of claim 2 in which the resistor and capacitor connected in series have a time constant of at least about 0.1 millisecond.

\* \* \* \* \*

UNITED STATES PATENT AND TRADEMARK OFFICE
CERTIFICATE OF CORRECTION

PATENT NO. : 5,946,173
DATED : August 31, 1999
INVENTOR(S) : Packard et al.

It is certified that error appears in the above-indentified patent and that said Letters Patent is hereby corrected as shown below:

On the title page, item [73] should read:
    Assignee: Pass & Seymour, Inc., Solvay, N.Y.

Signed and Sealed this

Thirteenth Day of June, 2000

Attest:

Q. TODD DICKINSON

*Attesting Officer*      *Director of Patents and Trademarks*